(12) United States Patent
Yanagibayashi

(10) Patent No.: US 12,038,107 B2
(45) Date of Patent: Jul. 16, 2024

(54) FITTING, PIPE CONNECTING STRUCTURE AND LIQUID CHROMATOGRAPH

(71) Applicant: SHIMADZU CORPORATION, Kyoto (JP)

(72) Inventor: Jun Yanagibayashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/743,310

(22) Filed: May 12, 2022

(65) Prior Publication Data
US 2022/0403959 A1 Dec. 22, 2022

(30) Foreign Application Priority Data
Jun. 17, 2021 (JP) .................................. 2021-100829

(51) Int. Cl.
*F16L 19/02* (2006.01)
*G01N 30/60* (2006.01)
*G01N 30/02* (2006.01)

(52) U.S. Cl.
CPC ...... *F16L 19/0206* (2013.01); *G01N 30/6026* (2013.01); *G01N 2030/027* (2013.01)

(58) Field of Classification Search
CPC . F16L 19/0206; F16L 19/0212; F16L 19/065; F16L 19/061; F16L 47/16; G01N 30/6026; G01N 30/6039; G01N 2030/027
See application file for complete search history.

(56) References Cited

U.S. PATENT DOCUMENTS

| | | | |
|---|---|---|---|
| 5,857,711 A * | 1/1999 | Comin-DuMong | |
| 9,134,283 B2 | 9/2015 | Hochgraeber et al. | |
| 9,194,417 B2 * | 11/2015 | Marchand | |
| 9,322,811 B2 * | 4/2016 | McAdams | G01N 30/6026 |
| 9,423,062 B2 * | 8/2016 | Steele | |
| 10,655,761 B2 | 5/2020 | Graham et al. | |
| 2011/0298210 A1 | 12/2011 | Hochgraeber et al. | |

(Continued)

FOREIGN PATENT DOCUMENTS

| | | |
|---|---|---|
| DE | 102016012080 A1 * | 4/2017 |
| JP | 2017-531805 A | 10/2017 |

OTHER PUBLICATIONS

DE 102016012080 A1—Machine Translation—English (Year: 2016).*

(Continued)

*Primary Examiner* — William S. Choi
(74) *Attorney, Agent, or Firm* — Renner, Otto, Boisselle & Sklar, LLP

(57) ABSTRACT

A fitting includes a screw portion that is rotatable around an axis extending in one direction, an operating portion that applies a torque around the axis to the screw portion, and a rotation auxiliary member that is configured to be engageable with the operating portion. A slot extending from a first end to a second end is provided in the rotation auxiliary member, and also a first projection that protrudes outward is provided on the rotation auxiliary member. A positional relationship of the first projection is set such that an engaging force between the rotation auxiliary member and the operating portion is increased due to a change in width of the slot in a case where a force is applied to the first projection in the first rotation direction with the rotation auxiliary member engaging with the operating portion.

9 Claims, 10 Drawing Sheets

(56) References Cited

U.S. PATENT DOCUMENTS

| | | | |
|---|---|---|---|
| 2013/0233053 A1* | 9/2013 | Beemer | F16L 19/065 |
| 2016/0116088 A1 | 4/2016 | Graham et al. | |
| 2016/0305586 A1 | 10/2016 | Graham et al. | |
| 2016/0375566 A1* | 12/2016 | Joshi | |
| 2017/0268704 A1 | 9/2017 | Graham et al. | |
| 2017/0276275 A1 | 9/2017 | Beemer et al. | |
| 2019/0176054 A1* | 6/2019 | Buerger | G01N 30/6026 |
| 2019/0186670 A1* | 6/2019 | Jencks | G01N 30/6026 |
| 2020/0292108 A1 | 9/2020 | Graham et al. | |
| 2022/0057032 A1 | 2/2022 | Beemer et al. | |

OTHER PUBLICATIONS

Office Action in corresponding Chinese Patent Application No. 202210526532.3 dated Aug. 11, 2023, with English machine translation.

\* cited by examiner

FITTING, PIPE CONNECTING STRUCTURE AND LIQUID CHROMATOGRAPH

BACKGROUND

Technical Field

The present invention relates to a fitting, a pipe connecting structure, and a liquid chromatograph.

Description of Related Art

A fitting is used to connect a pipe to a port of a liquid chromatograph or the like, for example. JP 2017-531805 A describes a fluid connection system for connecting a pipe to a port. The fluid connection system includes an actuator nut. The actuator nut has a knurled portion and a male threaded portion. The male threaded portion of the actuator nut is engaged with a female threaded portion of a main body of a casing.

SUMMARY

The actuator nut of JP 2017-531805 A has a knurled portion and, therefore, a user can easily turn the actuator nut with his/her fingers. In order for the user to securely fasten the male threaded portion with a small force with his/her hand, the knurled portion desirably has a large diameter.

On the other hand, in order to connect a pipe to a connected portion in a small space, an outer diameter of a fitting is desirably small.

As such, there is a contradiction between enabling securely fastening the male threaded portion of the fitting with the small force and enabling connecting the pipe to the connected portion in the small space. It is not easy to make these operations compatible with each other.

An object of the present invention is to provide a fitting that enables secure connection of a pipe while suppressing an increase in size of a connecting structure, a pipe connecting structure including the fitting, and a liquid chromatograph including the fitting.

A fitting used for connecting a pipe of a chromatograph according to one aspect of the present invention includes a screw portion that is rotatable around an axis extending in one direction, an operating portion that applies a torque around the axis to the screw portion, and a rotation auxiliary member that has a first end and a second end on opposite sides in the one direction and is configured to be engageable with the operating portion, the operating portion is provided to be rotatable in a first rotation direction of fastening the screw portion and in a second rotation direction of releasing the screw portion, a slot extending from the first end to the second end is provided in the rotation auxiliary member, and also a first projection that protrudes outward is provided on the rotation auxiliary member, and a positional relationship between the first projection and the slot is set such that an engaging force between the rotation auxiliary member and the operating portion is increased due to a change in width of the slot in a case where a force is applied to the first projection in the first rotation direction with the rotation auxiliary member engaging with the operating portion.

Other features, elements, characteristics, and advantages of the present disclosure will become more apparent from the following description of preferred embodiments of the present disclosure with reference to the attached drawings.

DETAILED DESCRIPTION

Figure 1:
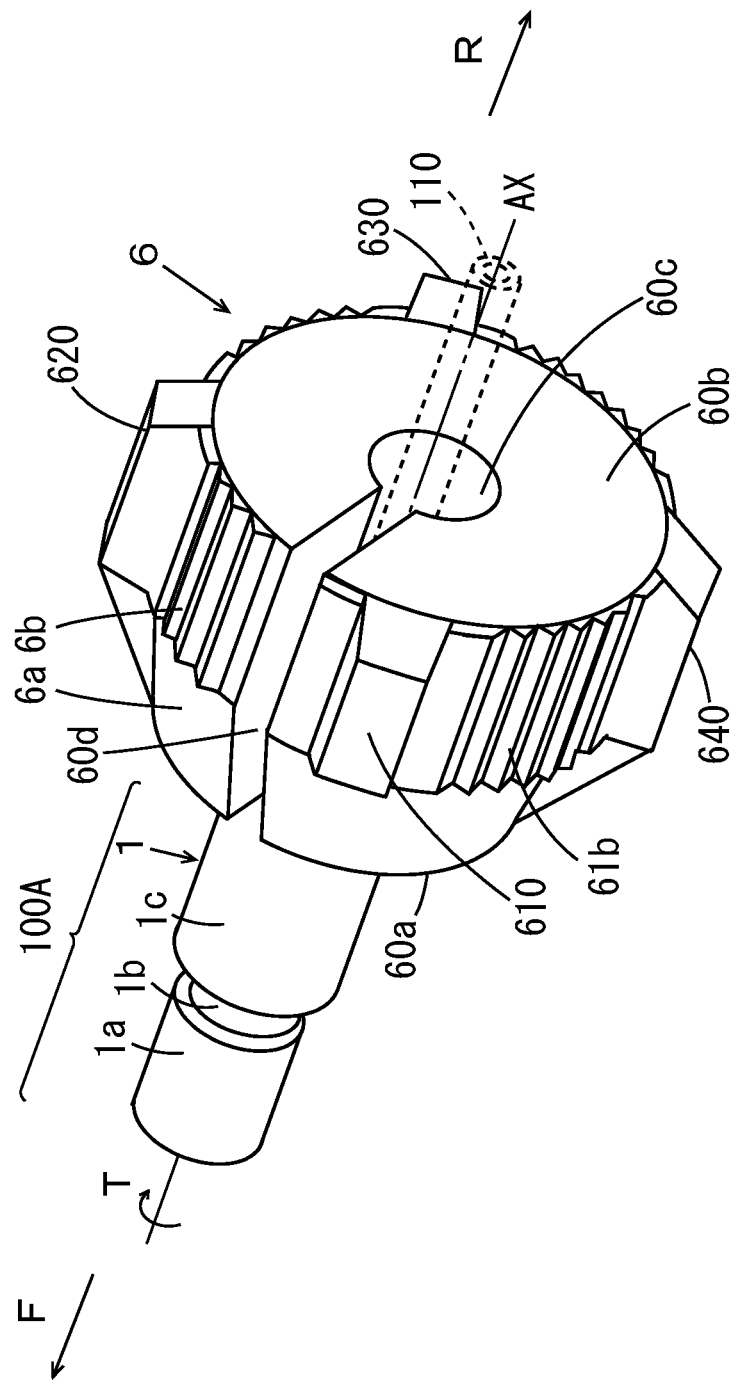
FIG. 1 is a perspective view of a fitting according to one embodiment.

A fitting according to embodiments of the present invention will now be described in detail with reference to the drawing. In the following embodiments, a ratchet fitting is explained as one example of the fitting.

(1) Configuration of Fitting

Figure 2:
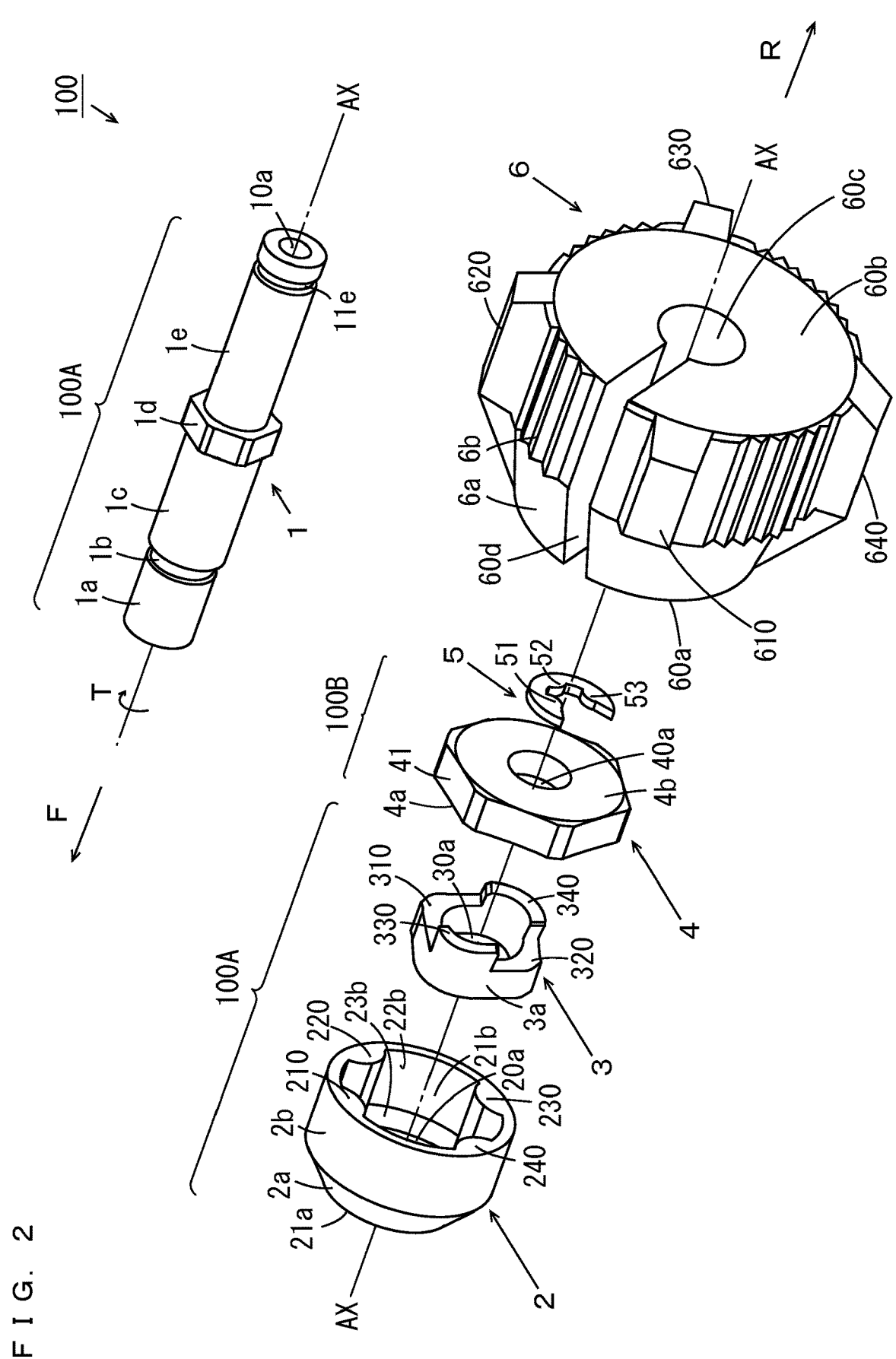
FIG. 2 is an exploded perspective view of the fitting of FIG. 1 as viewed obliquely rearward.
Figure 3:
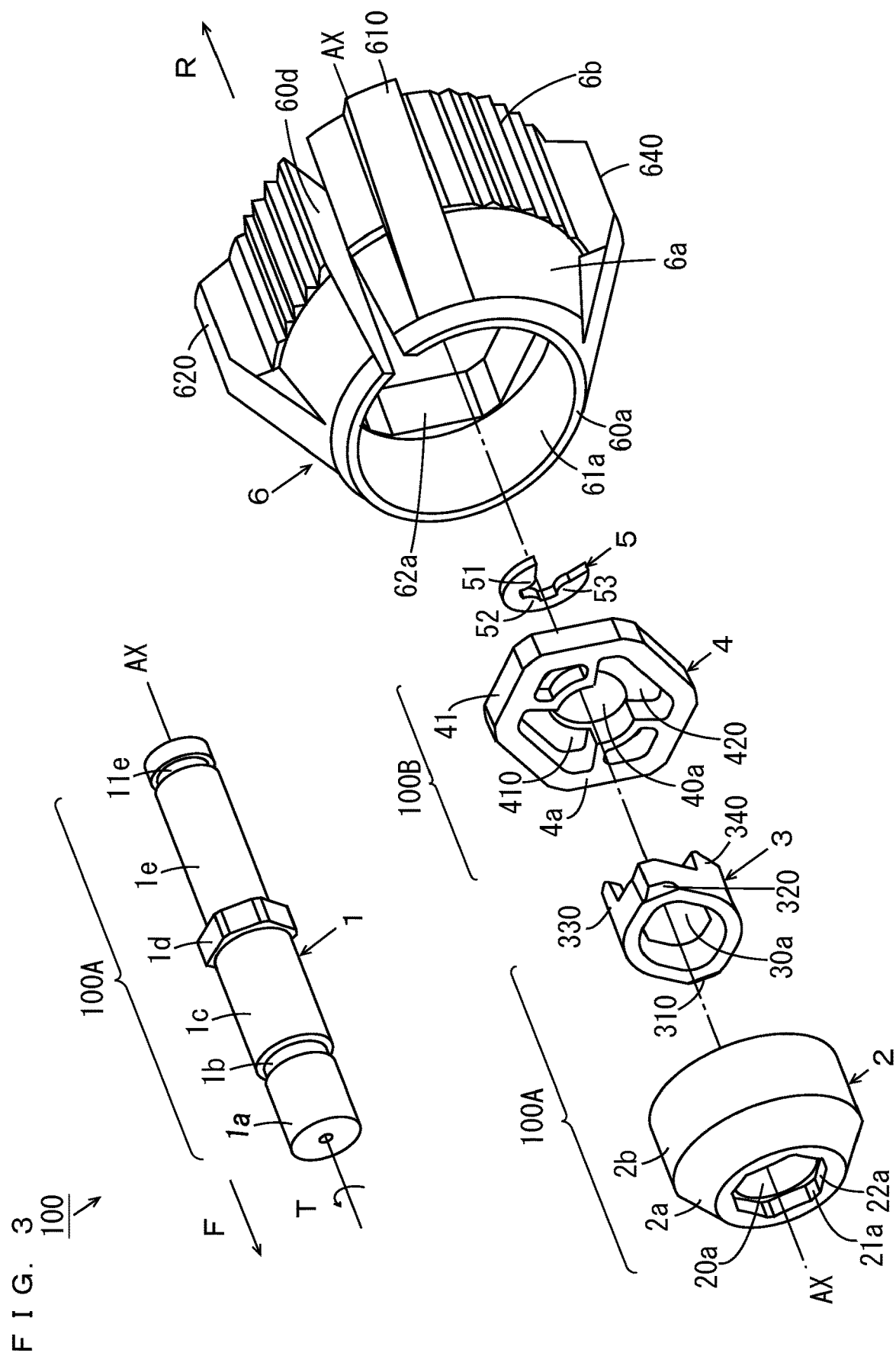
FIG. 3 is an exploded perspective view of the fitting of FIG. 1 as viewed from an obliquely forward position.

FIG. 1 is a perspective view of a fitting according to one embodiment. FIG. 2 is an exploded perspective view of the fitting of FIG. 1 as viewed obliquely rearward. FIG. 3 is an exploded perspective view of the fitting of FIG. 1 as viewed from an obliquely forward position. In each of FIGS. 1, 2 and 3, forward F and rearward R are respectively indicated by the arrows.

The fitting 100 of FIG. 1 includes a male nut 1, a main body 2, a spring 3 (see FIGS. 2 and 3), a head 4, a fixing plate 5, and a rotation auxiliary member 6. The male nut 1, the main body 2 and the fixing plate 5 constitute a screw portion 100A, and the spring 3 and the head 4 constitute an operating portion 100B.

As shown in FIGS. 2 and 3, the male nut 1 has a male threaded portion 1a, cylindrical portions 1b, 1c, an engaging portion 1d, and a cylindrical portion 1e in this order. In the present embodiment, the male threaded portion 1a, the cylindrical portions 1b, 1c, the engaging portion 1d, and the cylindrical portion 1e are integrally formed of stainless steel. The male nut 1 may be formed of another metal such as aluminum or a hard resin material. A linear communication hole 10a is formed within the male threaded portion 1a, the cylindrical portions 1b, 1c, the engaging portion 1d, and the cylindrical portion 1e to cause the male threaded portion 1a, the cylindrical portions 1b, 1c, the engaging portion 1d, and the cylindrical portion 1e to communicate with one another. Hereinafter, a center axis of the communication hole is referred to as an axis AX. A direction in which the axis AX extends is referred to as an axial direction. As indicated by the one-dot and dash line in FIG. 1, a pipe 110 is inserted into the communication hole 10a. In the present embodiment, the fitting 100 of FIGS. 1 to 3 is used for a liquid chromatograph. The fitting 100 of FIGS. 1 to 3 may be used for another chromatograph such as a supercritical fluid liquid chromatograph.

The male threaded portion 1a is cylindrical. A male thread is formed on an outer peripheral surface of the male threaded portion 1a. Hereinafter, a rotation direction for fastening the male threaded portion is referred to as a fastening direction T. In the present embodiment, the cylindrical portion 1b has an outer diameter smaller than that of the cylindrical portion 1c. The engaging portion 1d has a hexagonal cross section. In the present embodiment, the cylindrical portion 1e has an outer diameter smaller than that of the cylindrical portion 1c. An annular groove portion 11e is formed in the vicinity of a rear end of an outer peripheral surface of the cylindrical portion 1c.

The main body 2 includes a tapered portion 2a and a cylindrical portion 2b. The tapered portion 2a has an outer diameter that gradually decreases forward F from the cylindrical portion 2b. As shown in FIG. 3, an opening 21a that opens forward F is formed in the tapered portion 2a. An inner peripheral surface 22a having a hexagonal cross section corresponding to the hexagonal cross section of the engaging portion 1d of the male nut 1 is formed in the opening 21a.

As shown in FIG. 2, an opening 21b that opens rearward R is formed in the cylindrical portion 2b. The opening 21b has an inner peripheral surface 22b having a circular cross section. A plurality of projections 210, 220, 230, 240 are provided on the inner peripheral surface 22b of the opening 21b so as to respectively extend in the axial direction. The plurality of projections 210, 220, 230, 240 are arranged at equal angular intervals around the axis AX. In the present embodiment, the four projections 210, 220, 230, 240 are provided. The cylindrical portion 2b has an annular abutting surface 23b surrounding the opening 21b. The opening 21a of the tapered portion 2a and the opening 21b of the cylindrical portion 2b communicate with each other through a through hole 20a.

The tapered portion 2a and the cylindrical portion 2b of the main body 2 are integrally formed of resin. In the present embodiment, the main body 2 is formed of PEEK (polyether ether ketone). The main body 2 may be formed of another resin such as PTFE (polytetrafluoroethylene).

The spring 3 includes an annular portion 300, a plurality of protrusions 310, 320, and a plurality of convex portions 330, 340. The annular portion 300 has a substantially circular or substantially oval cross section. The annular portion 300 has a through hole 30a. The plurality of protrusions 310, 320 are formed on an outer peripheral surface of the annular portion 300 so as to extend outward of the annular portion 300. Further, the plurality of protrusions 310, 320 are arranged at equal angular intervals around the axis AX. In the present embodiment, the two protrusions 310, 320 are formed at positions symmetrical to each other about the axis AX.

The plurality of convex portions 330, 340 are formed so as to extend rearward and in the axial direction from the rear end surface of the annular portion 300. Further, the plurality of convex portions 330, 340 are arranged at equal angular intervals around the axis AX. In the present embodiment, the two convex portions 330, 340 are formed at positions symmetrical to each other about the axis AX.

The spring 3 is formed of an elastic material which can be deformed and has a restoring force. In the present embodiment, the annular portion 300, the plurality of protrusions 310, 320, and the plurality of convex portions 330, 340 of the spring 3 are integrally formed of resin. In the present embodiment, the spring 3 is formed of PEEK (polyether ether ketone). The spring 3 may be formed of another resin such as PTFE (polytetrafluoroethylene) softer than the male nut 1.

The head 4 has a front end surface 4a shown in FIG. 3 and a rear end surface 4b shown in FIG. 2 and has an outer peripheral surface parallel to the axial direction. The outer peripheral surface of the head 4 has a hexagonal cross section. The outer peripheral surface of the head 4 is hereinafter referred to as an engaging surface 41. A through hole 40a is provided in a center portion of the head 4. As shown in FIG. 3, a plurality of concave portions 410, 420 are formed in the front end surface 4a of the head 4. The plurality of concave portions 410, 420 are arranged at equal angular intervals around the through hole 40a so as to correspond to the plurality of convex portions 330, 340 of the spring 3. The plurality of convex portions 330, 340 can be fitted to the plurality of concave portions 410, 420. In the present embodiment, the two concave portions 410, 420 are formed at positions symmetrical to each other about the axis AX.

The head 4 is made of resin. In the present embodiment, the head 4 is formed of PEEK (polyether ether ketone). The head 4 may be formed of another resin such as PTFE (polytetrafluoroethylene).

The fixing plate 5 has an arc shape. Protrusions 51, 52, 53 protruding inward are formed on the fixing plate 5. The protrusions 51, 52, 53 are formed to be attachable to the groove portion 11e of the cylindrical portion 1e of the male nut 1.

The rotation auxiliary member 6 has a front end surface 60a shown in FIG. 3 and a rear end surface 60b shown in FIG. 2. The rotation auxiliary member 6 includes a tapered portion 6a and a fastening portion 6b between the front end surface 60a and the rear end surface 60b. The tapered portion 6a has an outer diameter that gradually decreases forward F from the fastening portion 6b to the front end surface 60a. The rotation auxiliary member 6 is referred to as a nob.

As shown in FIG. 3, an opening 61a that opens forward F is formed in the tapered portion 6a. An engaged surface 62a having a hexagonal cross section corresponding to the engaging surface 41 of the head 4 is formed on an inner peripheral surface of the opening 61a. A through hole 60c that communicates with the opening 61a of the tapered portion 6a from the rear end surface 60b is provided in the fastening portion 6b. A slot 60d that extends from the front end surface 60a to the rear end surface 60b is provided in the tapered portion 6a and the fastening portion 6b of the rotation auxiliary member 6. The slot 60d is formed to extend from an outer peripheral surface of the rotation auxiliary member 6 to the axis AX. In the present embodiment, a plurality of projections 610, 620, 630, 640 are provided on an outer peripheral surface of the fastening portion 6b of the rotation auxiliary member 6 so as to respectively project outward and extend in the axial direction. A height of each of the projections 610, 620, 630, 640 protruding outward is desirably at least 1 mm or more. In the present embodiment, the height of each of the projections 610, 620, 630, 640 protruding outward is 2 mm. In the present embodiment, the four projections 610, 620, 630, 640 are provided at equal angles. An auxiliary knurl with a lower height is provided between each of the four projections 610, 620, 630, 640 on the outer peripheral surface of the fastening portion 6b of the rotation auxiliary member 6.

The rotation auxiliary member 6 can be easily manufactured by a resin molding process. In the present embodiment, the rotation auxiliary member 6 is formed of PA (polyamide). The rotation auxiliary member 6 may be formed of another resin such as PEEK (polyether ether ketone)) or PTFE (polytetrafluoroethylene). The rotation auxiliary member 6 is formed of resin and, therefore, has a lower rigidity as compared to the rotation auxiliary member 6 formed of metal. As such, a width of the slot 60d of the rotation auxiliary member 6 is likely to be reduced and increased. This rotation auxiliary member 6 is configured to be attachable to and detachable from the operating portion 100B.

As shown in FIGS. 2 and 3, when the fitting 100 is assembled, the cylindrical portion 1e of the male nut 1 is fitted to the main body 2, the spring 3, and the head 4. In this state, the hexagonal inner peripheral surface of the opening 21a of the tapered portion 2a of the main body 2 engages with the hexagonal engaging portion 1d of the male nut 1. Thus, the main body 2 is non-rotatably fixed to the male nut 1. The spring 3 is accommodated in the opening 21b of the cylindrical portion 2b of the main body 2. Further, the convex portions 330, 340 of the spring 3 are fitted to the concave portions 410, 420 of the head 4. The front end surface 4a of the head 4 rotatably comes into contact with the rear end surface of the main body 2. The rear end of the cylindrical portion 1e of the male nut 1 protrudes rearward R from the through hole 40a of the head 4. As shown in FIG. 1, the protrusions 51 to 53 of the fixing plate 5 are fitted to the groove portion 11e of the cylindrical portion 1e protruding from the head 4. Thus, the spring 3 and the head 4 are rotatably attached to the male nut 1 and the main body 2.

(2) Engagement of Main Body 2 and Spring 3

Figure 4:
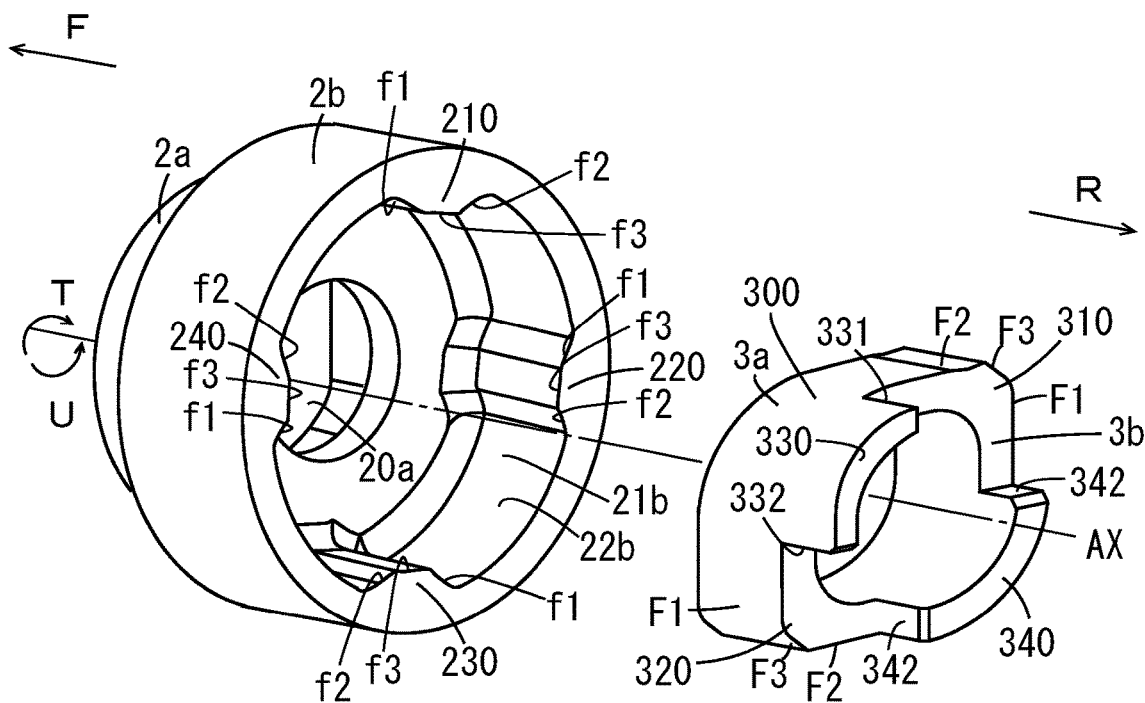
FIG. 4 is an enlarged perspective view of a main body and a spring of FIGS. 2 and 3.
Figure 5:
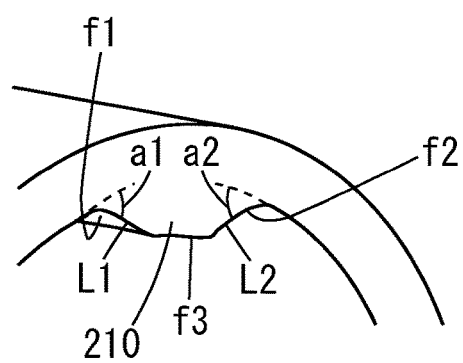
FIG. 5 is an enlarged perspective view of the main body of FIG. 4.
Figure 6:
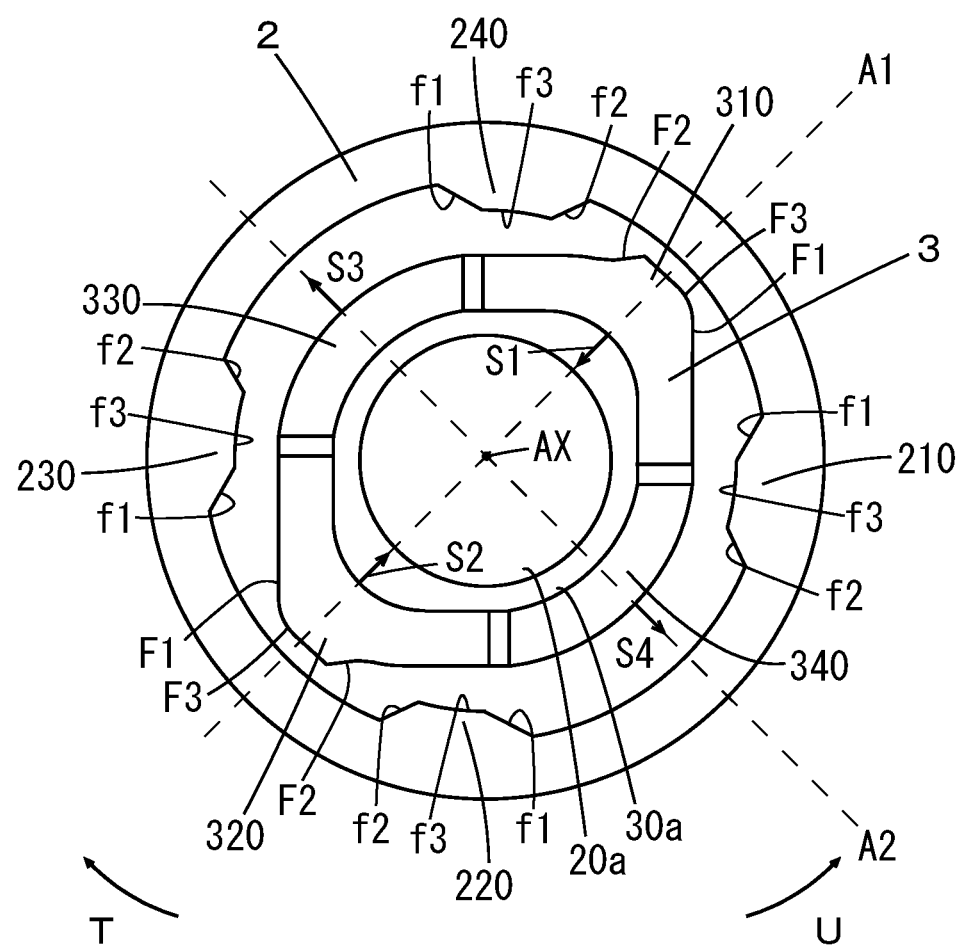
FIG. 6 is a plan view showing the spring accommodated in the main body of FIG. 4.

FIG. 4 is an enlarged perspective view of the main body 2 and the spring 3 of FIGS. 2 and 3. FIG. 5 is an enlarged perspective view of the main body 2 of FIG. 4. FIG. 6 is a plan view showing the spring 3 accommodated in the main body 2 of FIG. 4. FIG. 6 shows a rear view of the main body 2 and the spring 3 (as viewed in the axial direction from a rear position).

Each of the projections 210 to 240 of the main body 2 has engaged surfaces f1, f2 and an intermediate surface f3. The engaged surface f1 is formed to be inclined inward from the inner peripheral surface 22b of the cylindrical portion 2b in the fastening direction T. The engaged surface f2 is formed to be inclined inward from the inner peripheral surface 22b of the cylindrical portion 2b in a direction opposite to the fastening direction T (hereinafter referred to as a releasing direction U). The intermediate surface f3 has a circular cross section centered at the axis AX and is formed to connect the engaged surface f1 and the engaged surface f2 to each other.

As shown in FIG. 5, an angle a1 formed by the engaged surface f1 and the inner peripheral surface 22b in the fastening direction T is smaller than an angle a2 formed by the engaged surface f2 and the inner peripheral surface 22b in the releasing direction. A length L1 of the engaged surface f1 in a circumferential direction is larger than a length L2 of the engaged surface f2 in the circumferential direction.

As shown in FIG. 6, each of the protrusions 310, 320 of the spring 3 has engaging surfaces F1, F2 and an intermediate surface F3. The engaging surface F1 is formed in a flat shape and extends from an outer peripheral surface 3a of the annular portion 300 to the intermediate surface F3 in the releasing direction U. The engaging surface F2 is formed to be slightly curved in a concave shape and extends from the outer peripheral surface 3a of the annular portion 300 to the intermediate surface F3 in the fastening direction T. The intermediate surface F3 is formed to be slightly curved in a convex shape. Here, in the rear view of FIG. 6, an axis passing through the center of the intermediate surfaces F3 of the protrusions 310, 320 is referred to as an axis A1. An axis orthogonal to the axis A1 is referred to as an axis A2. The axes A1, A2 are orthogonal to the axis AX.

A length of the spring 3 in the direction of the axis A1 (a length between the center of the intermediate surface F3 of the protrusion 310 and the center of the intermediate surface F3 of the protrusion 320) is larger than a length of the spring 3 in the direction of the axis A2. That is, a length from the axis AX to the intermediate surface F3 of the protrusion 310 is larger than a length from the axis AX to one outer peripheral surface of the annular portion 300 in the direction of the axis A2. That is, a length from the axis AX to the intermediate surface F3 of the protrusion 320 is larger than a length from the axis AX to the other outer peripheral surface of the annular portion 300 in the direction of the axis A2.

In a case where the spring 3 rotates about the axis AX in the fastening direction T with a torque smaller than a predetermined torque (hereinafter referred to as a set torque), the engaging surface F1 of the protrusion 310 of the spring 3 comes into contact with the engaged surface f1 of the projection 210 of the main body 2, and the engaging surface F1 of the protrusion 320 of the spring 3 comes into contact with the engaged surface f1 of the projection 230 of the main body 2. Thus, the spring 3 engages with the main body 2. As a result, the main body 2 rotates in the fastening direction T together with the spring 3.

In this state, when the spring 3 rotates about the axis AX in the fastening direction T with a torque equal to or smaller than a predetermined torque prescribed value, reaction forces exerted on the engaged faces f1 of the projections 210, 230 are applied to the protrusions 310, 320. Thus, the protrusions 310, 320 are respectively deformed inward toward the axis AX as indicated by the arrows S1 and S2. Along with this, the annular portion 300 between the protrusions 310, 320 of the spring 3 is deformed outward away from the axis AX as indicated by the arrows S3 and S4. In this manner, the spring 3 is compressed in the direction of the axis A1 and expanded in the direction of the axis A2. In this case, the protrusions 310, 320 of the spring 3 can climb over the projections 210 to 240 of the main body 2. Thus, the spring 3 disengages from the main body 2. As a result, the spring 3 runs idle with respect to the main body 2.

With such a configuration, even if a torque larger than the torque prescribed value is applied to the spring 3 in the fastening direction T, a torque larger than the torque prescribed value is not applied to the main body 2.

On the other hand, in a case where the spring 3 rotates about the axis AX in the releasing direction U with any torque, the engaging surface F2 of the protrusion 310 of the spring 3 comes into contact with the engaged surface f2 of the projection 210 of the main body 2, and the engaging surface F2 of the protrusion 320 of the spring 3 comes into contact with the engaged surface f2 of the projection 230 of the main body 2. Thus, the spring 3 engages with the main body 2. As a result, the main body 2 rotates in the releasing direction U together with the spring 3.

In this case, the angle a2 of the engaged surface f2 of each of the projections 210 to 240 of the main body 2 is larger than the angle a1 of the engaged surface f1, and the engaging surface F2 of each of the protrusions 310, 320 of the spring 3 is formed in a concave shape. Therefore, the spring 3 and the main body 2 are unlikely to disengage from each other. Therefore, in a case where a torque larger than the torque prescribed value is applied to the spring 3 in the releasing direction U, the main body 2 rotates in the releasing direction U together with the spring 3.

(3) Fitting of Spring 3 and Head 4

Figure 7:
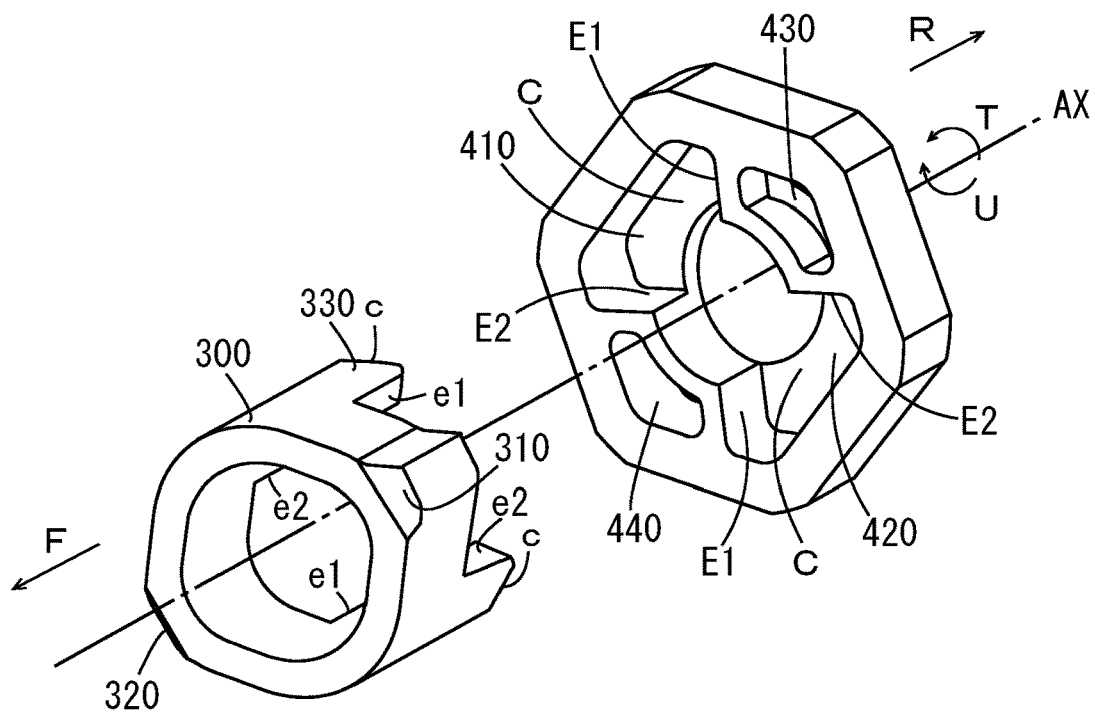
FIG. 7 is an enlarged perspective view of the spring and a head of FIGS. 2 and 3.
Figure 8:
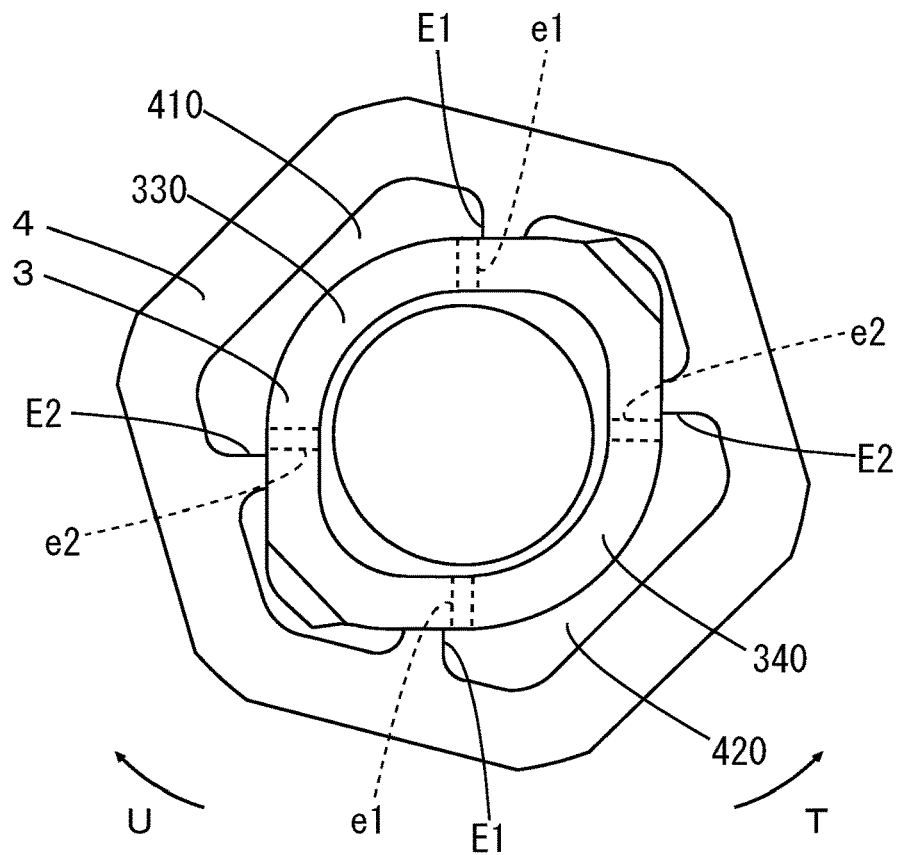
FIG. 8 is a plan view showing the spring fitted to the head of FIG. 7.

FIG. 7 is an enlarged perspective view of the spring 3 and the head 4 of FIGS. 2 and 3. FIG. 8 is a plan view showing the spring 3 being fitted to the head 4 of FIG. 7. FIG. 8 shows a front view of the spring 3 and the head 4 (as viewed in the axial direction from a forward position).

Each of the convex portions 330, 340 of the spring 3 has an abutting surface c and contact surfaces e1, e2. The contact surfaces e1, e2 of each of the convex portions 330, 340 are formed to extend in the axial direction. The abutting surface c of each of the convex portions 330, 340 is formed to be perpendicular to the axis AX so as to connect the contact surface e1 and the contact surface e2 to each other. In the present embodiment, as shown in FIG. 6, the contact surface e1 of each of the convex portions 330, 340 is located at an intermediate position between the center of the intermediate surface F3 of each of the protrusions 310, 320 that are deformed inward and the center of the annular portion 300 that is deformed outward in a rear view. Each contact surface e1 is preferably formed at a position that bisects the angle between the axis A1 and the axis A2.

Each of the concave portions 410, 420 of the head 4 has an abutted surface C and contacted surfaces E1, E2. The contacted surfaces E1, E2 are formed to extend in parallel with the axial direction and in a radial direction around the axis AX. The abutted surface C of each of the convex portions 330, 340 is formed to be perpendicular to the axis AX so as to connect the contacted surface E1 and the contacted surface E2 to each other.

The convex portions 330, 340 of the spring 3 are fitted to the concave portions 410, 420 of the head 4. In this state, as shown in FIG. 8, when the head 4 rotates in the fastening direction T about the axis AX, the contacted surface E1 of the concave portion 410 comes into contact with the contact surface e1 of the convex portion 330, and the contacted surface E1 of the concave portion 420 comes into contact with the contact surface e1 of the convex portion 340. Thus, the spring 3 rotates integrally with the head 4 in the fastening direction T.

Further, when the head 4 rotates in the releasing direction U about the axis AX, the contacted surface E2 of the concave portion 410 comes into contact with the contact surface e2 of the convex portion 330, and the contacted surface E2 of the concave portion 420 comes into contact with the contact surface e2 of the convex portion 340. Thus, the spring 3 rotates integrally with the head 4 in the releasing direction U.

(4) Attachment of Rotation Auxiliary member 6 to Head 4

Figure 9:
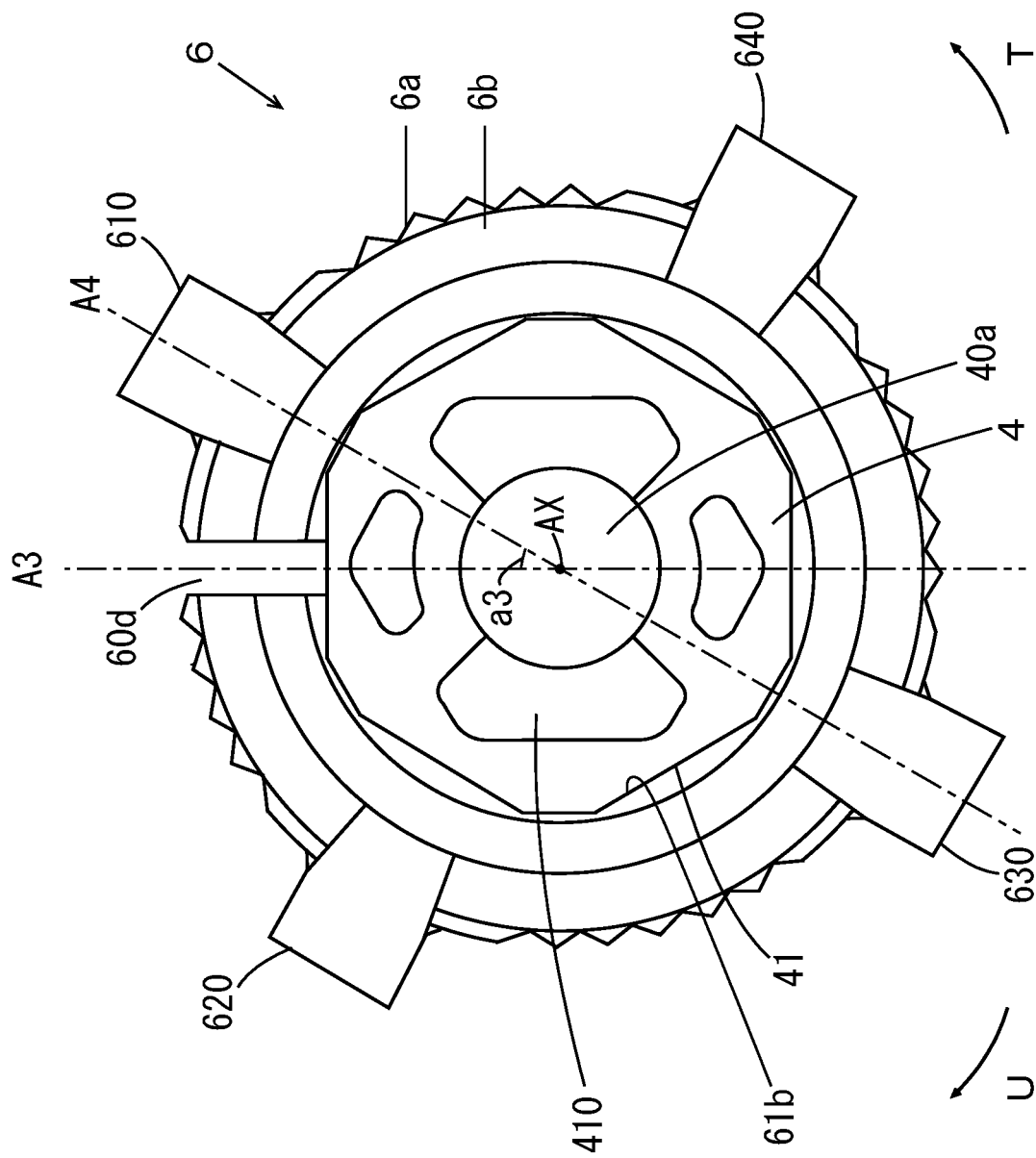
FIG. 9 is a plan view showing a rotation auxiliary member being attached to the head of FIGS. 2 and 3.

FIG. 9 is a plan view showing the rotation auxiliary member 6 being attached to the head 4 of FIGS. 2 and 3. FIG. 9 shows a front view of the head 4 and the rotation auxiliary member 6 (as viewed in the axial direction from a forward position).

The head 4 is fitted to the opening 61a of the rotation auxiliary member 6 such that the engaged surface 62a and the engaging surface 41 of the head 4 engage with each other. In the present embodiment, the engaged surface 62a of the rotation auxiliary member 6 and the engaging surface 41 of the head 4 each have a hexagonal shape. A slight gap (e.g., 0.1 mm) is provided between the engaged surface 62a of the rotation auxiliary member 6 and the engaging surface 41 of the head 4 in view of a dimension tolerance. Here, in the front view of FIG. 9, an axis passing through the center of the slot 60d in a width direction and through the axis AX is referred to as an axis A3. The axis A3 and the axis AX are orthogonal to each other.

Among the plurality of projections 610 to 640 of the fastening portion 6b of the rotation auxiliary member 6, the projection closest to the slot 60d is hereinafter referred to as the first projection 610. Also, the projection 620 on the opposite side to the first projection 610 with respect to the slot 60d is referred to as the second projection 620. In the present embodiment, the first projection 610 is provided on the side of the releasing direction U with respect to the slot 60d. Here, in the front view of FIG. 9, an axis passing through a center of the first projection 610 in a circumferential direction and through the axis AX is referred to as an axis A4. The axis A4 and the axis AX are orthogonal to each other.

The first projection 610 is arranged such that an engaging force between the engaging surface 41 of the head 4 and the engaged surface 62a of the rotation auxiliary member 6 is increased in a case where a force in the fastening direction T is applied to the first projection 610. Specifically, the first projection 610 is provided such that an angle a3 formed by the axis A3 and the axis A4 is equal to or less than 45 degrees. The angle a3 formed by the axis A3 and the axis A4 is preferably equal to or less than 30 degrees, more preferably equal to or less than 20 degrees, and still more preferably equal to or less than 10 degrees. In the fastening direction T, a distance between the first projection 610 and the slot 60d is smaller than a distance between the slot 60d and the second projection 620.

As shown in FIG. 9, when a force in the fastening direction T is applied to the first projection 610 of the rotation auxiliary member 6 by hand, the rotation auxiliary member 6 rotates in the fastening direction T about the axis AX, and the engaged surface 62a of the rotation auxiliary member 6 comes into contact with the engaging surface 41 of the head 4. Thus, the rotation auxiliary member 6 engages with the head 4. As a result, the head 4 rotates in the fastening direction T together with the rotation auxiliary member 6. Thus, a width of the slot 60d in a circumferential direction tends to be increased due to a counteraction to the force in the fastening direction T. In this case, since the distance between the first projection 610 and the slot 60d is small, the fastening portion 6b is deformed such that the width of the slot 60d is reduced. As a result, the gap between the engaging surface 41 of the head 4 and the engaged surface 62a of the rotation auxiliary member 6 is reduced, so that the engaging force between the head 4 and the rotation auxiliary member 6 is increased.

After the connection of the pipe 110 by the fitting 100, an operator moves the rotation auxiliary member 6 rearward R to detach the rotation auxiliary member 6 from the head 4. Then, the operator moves the rotation auxiliary member 6 to allow the pipe 110 to pass through the slot 60d. Thus, the rotation auxiliary member 6 is detached from the head 4 and the pipe 110.

In a case of detaching the pipe 110 connected by the fitting 100, the operator moves the rotation auxiliary member 6 to allow the pipe 110 to pass through the slot 60d, thereby to fit the rotation auxiliary member 6 to the pipe 110. Then, the operator moves the rotation auxiliary member 6 forward F to fit the rotation auxiliary member 6 to the head 4. Thus, the rotation auxiliary member 6 is attached to the head 4 and the pipe 110.

In this state, when the operator applies a force in the releasing direction U to the second projection 620 of the rotation auxiliary member 6 by hand, the rotation auxiliary member 6 rotates about the axis AX in the releasing direction U, and the engaged surface 62a of the rotation auxiliary member 6 comes into contact with the engaging surface 41 of the head 4. Thus, the rotation auxiliary member 6 engages with the head 4. As a result, the head 4 rotates in the releasing direction U together with the rotation auxiliary member 6.

(5) Example of Connection of Pipe by Fitting 100

Figure 10:
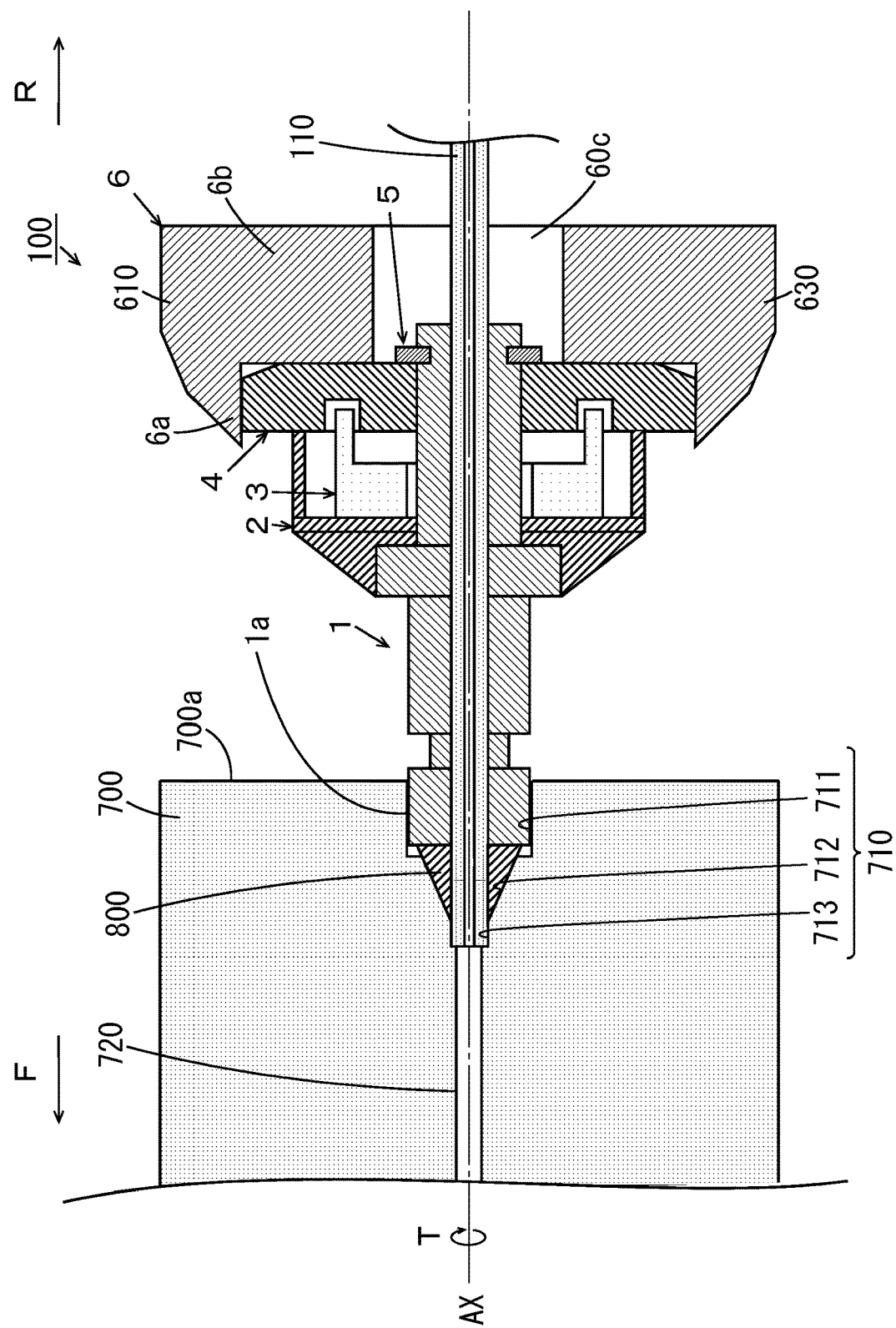
FIG. 10 is a cross sectional view showing a connecting structure of a pipe by the fitting of FIG. 1.

FIG. 10 is a cross sectional view showing a connecting structure of a pipe by the fitting of FIG. 1.

A connected member 700 includes a connected hole 710 and a flow path 720. The connected hole 710 is provided in a rear end surface 700a of the connected member 700. The connected hole 710 includes a female threaded portion 711, a tapered portion 712, and a cylindrical portion 713. The female threaded portion 711, the tapered portion 712, and the cylindrical portion 713 are formed forward F in this order from the rear end surface 700a. A female thread corresponding to the male threaded portion 1a of the male nut 1 of the fitting 100 is formed on an inner peripheral surface of the female threaded portion 711. The female threaded portion 711 and the cylindrical portion 713 are cylindrical. An inner diameter of the female threaded portion 711 is larger than that of the cylindrical portion 713. An inner peripheral surface of the tapered portion 712 has an inner diameter gradually decreasing from the female threaded portion 711 to the cylindrical portion 713. The flow path 720 is formed to extend forward F from the cylindrical portion 713 about the axis AX. A pipe 110 is inserted into the fitting 100. In the present example, a ferrule 800 is attached to an outer peripheral surface of the pipe 110 protruding forward from the male threaded portion 1a of the fitting 100.

The male nut 1 of the fitting 100 is inserted into the connected hole 710 of the connected member 700. The tapered portion 712 is filled with the ferrule 800. The male threaded portion 1a of the male nut 1 is screwed into the female threaded portion 711 of the connected hole 710. Thus, the pipe 110 is connected to the connected member 700 by the fitting 100. With this configuration, when the fitting 100 is fastened, a rear end surface of the ferrule 800 is pressed forward by the front end surface of the male threaded portion 1a. Thus, the connected hole 710 and the pipe 110 are sealed by the ferrule 800. In the fitting 100 of the present embodiment, since a fastening torque is provided with high accuracy, variations in force pressing the rear end surface of the ferrule 800 are reduced. Therefore, sealing between the connected hole 710 and the pipe 110 is stabilized.

(6) Effects of Embodiment

With the fitting 100 according to the present embodiment, with the rotation auxiliary member 6 engaging with the operating portion 1006, when the force is applied to the projection 610 in the fastening direction T by the operator's hand, for example, the torque in the fastening direction T is applied to the screw portion 100A from the operating portion 1006. Thus, the screw portion 100A is fastened to the connected member 700. In this case, since the distance between the projection 610 and the slot 60d is small, in a case where the force is applied to the projection 610 in the fastening direction T, the rotation auxiliary member 6 is deformed such that the width of the slot 60d of the rotation auxiliary member 6 is reduced. As a result, the engaging force between the engaging surface 41 of the head 4 and the engaged surface 62a of the rotation auxiliary member 6 is increased. Therefore, the force is securely transmitted from the rotation auxiliary member 6 to the operating portion 1006. In this case, since the projection 610 projects outward, the operating portion 1006 can be rotated with a small force.

Also, the rotation auxiliary member 6 can be detached from the pipe 110 and the operating portion 1006 through the slot 60d after the connection of the pipe 110 to the connected member 700 by fastening of the screw portion 100A. Thus, the connecting structure of the pipe 110 is not increased in size. As a result, it is possible to securely connect the pipe 110 while suppressing an increase in size of the connecting structure. Thus, it is possible to connect the pipe 110 in a small space.

Also, in a case where the force is applied to the projection 620 in the fastening direction T, the width of the slot 60d is increased. With the configuration of the present embodiment, in a case where the force is applied to the projection 610 and the projection 620 in the fastening direction T, the distance between the projection 620 and the slot 60d is larger than that between the projection 610 and the slot 60d and, therefore, the action of increasing the width of the slot 60d becomes relatively small. Here, "relatively" means a comparison between the case where the distance between the projection 620 and the slot 60d is equal to the distance between the projection 610 and the slot 60d and the case where the distance between the projection 620 and the slot 60d is smaller than the distance between the projection 610 and the slot 60d. This suppresses a reduction in engaging force between the engaging surface 41 of the head 4 and the engaged surface 62a of the rotation auxiliary member 6. Thus, the rotation auxiliary member 6 is easily rotated by applying the force to the projections 610 and 620.

Further, the width of the slot 60d can be increased by applying the force only to the projection 620 in the fastening direction T and not applying the force to the projection 610 in the fastening direction T. Thus, the engaged surface 62a of the rotation auxiliary member 6 can be easily released from the engaging surface 41 of the head 4. As a result, the rotation auxiliary member 6 can be easily detached from the operating portion 1006.

Also, in a case where each of the engaging surface 41 of the operating portion 1006 and the engaged surface 62a of the rotation auxiliary member 6 has a circular shape in a cross section intersecting with the axial direction, the engaging surface 41 of the operating portion 1006 and the engaged surface 62a of the rotation auxiliary member 6 engage with each other by a friction force. In contrast, in a case where each of the engaging surface 41 of the operating portion 1006 and the engaged surface 62a of the rotation auxiliary member 6 has a non-circular shape in a cross section intersecting with the axial direction, the engaging surface 41 of the operating portion 1006 and the engaged surface 62a of the rotation auxiliary member 6 are engaged with each other due to the shapes of the engaging surface 41 and the engaged surface 62a in addition to the friction force. Thus, relative rotation of the rotation auxiliary member 6 and the operating portion 1006 is suppressed.

Figure 11:
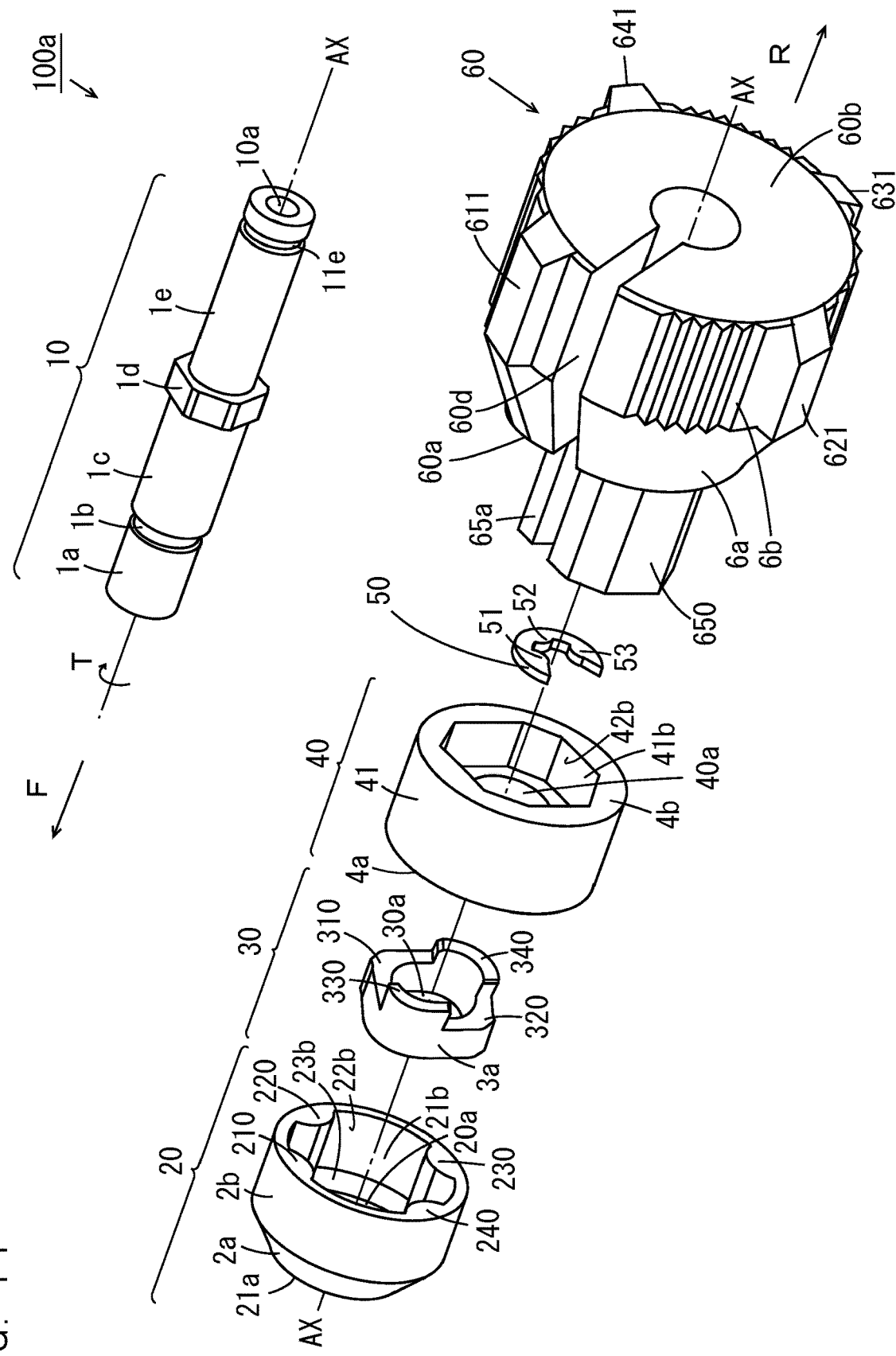
FIG. 11 is an exploded perspective view of a fitting according to another embodiment as viewed obliquely rearward.
Figure 12:
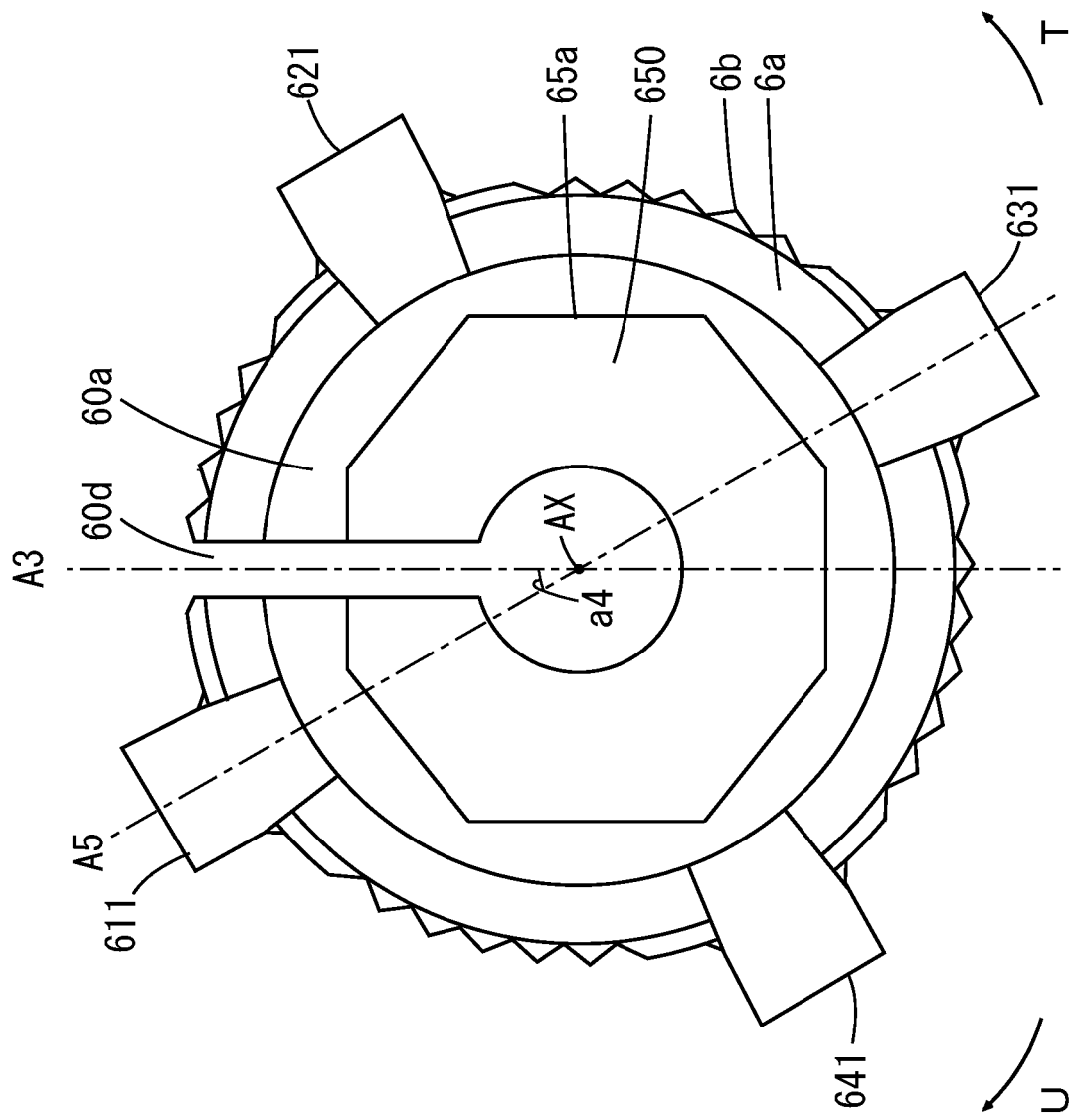
FIG. 12 is a plan view of a rotation auxiliary member of FIG. 11 as viewed from a forward position.

(7) Other Embodiments (7-1) FIG. 11 is an exploded perspective view of a fitting according to another embodiment as viewed obliquely rearward. In FIG. 11, forward F and rearward R are respectively indicated by the arrows. FIG. 12 is a plan view of a rotation auxiliary member 60 of FIG. 11 as viewed from a forward position.

A fitting 100a of FIG. 11 includes a male nut 10, a main body 20, a spring 30, a head 40, a fixing plate 50, and the rotation auxiliary member 60. The configurations of the male nut 10, the main body 20, the spring 30, and the fixing plate 50 are similar to those of the male nut 1, the main body 2, the spring 3, and the fixing plate 5 of FIGS. 2 and 3. The configuration of a front end surface 4a of the head 40 is similar to that of the front end surface 4a of the head 4 of FIGS. 2 and 3. An opening 41b is formed in a rear end surface 4b of the head 40. An engaged surface 42b having an octagonal cross section is formed on an inner peripheral surface of the opening 41b.

An engagement portion 650 protruding forward is provided on a front end surface 60a of the rotation auxiliary member 60. An engaging surface 65a is formed on an outer peripheral surface of the engagement portion 650. The engaging surface 65a has an octagonal shape corresponding to the engaged surface 42b of the head 4. The engagement portion 650 of the rotation auxiliary member 60 is fitted to the opening 41b of the head 4. A slight gap (e.g., 0.1 mm) is provided between the engaging surface 65a of the rotation auxiliary member 60 and the engaged surface 42b of the head 40 in view of a dimension tolerance.

In the present embodiment, a plurality of projections 611, 621, 631, 641 are provided on an outer peripheral surface of a fastening portion 6b of the rotation auxiliary member 60 so as to respectively protrude outward and extend in the axial direction. A height of each of the projections 611, 621, 631, 641 protruding outward is desirably at least 1 mm or more. In the present embodiment, the height of each of the projections 611, 621, 631, 641 protruding outward is 2 mm. In the present embodiment, the four projections 611, 621, 631, 641 are provided at equal angles. An auxiliary knurl with a lower height is provided between each of the four projections 611, 621, 631, 641 on the outer peripheral surface of the fastening portion 6b of the rotation auxiliary member 60.

Among the plurality of projections 611 to 641 of the fastening portion 6b of the rotation auxiliary member 60, the projection closest to the slot 60d is hereinafter referred to as the first projection 611. Also, the projection 621 on the opposite side to the first projection 611 with respect to the slot 60d is referred to as the second projection 621. In the present embodiment, the first projection 611 is provided on the side of the fastening direction T with respect to the slot 60d. Here, in the front view of FIG. 12, an axis passing through a center of the first projection 611 in a circumferential direction and through the axis AX is referred to as an axis A5. The axis A5 and the axis AX are orthogonal to each other.

As shown in FIG. 12, the first projection 611 is arranged such that an engaging force between the engaged surface 42b of the head 40 and the engaging surface 65a of the rotation auxiliary member 60 is increased in a case where a force in the fastening direction T is applied to the first projection 611. Specifically, the first projection 611 is provided such that an angle a4 formed by the axis A3 and the axis A5 is equal to or less than 45 degrees. The angle a4 formed by the axis A3 and the axis A5 is preferably equal to or less than 30 degrees, more preferably equal to or less than 20 degrees, and still more preferably equal to or less than 10 degrees. In the releasing direction U, a distance between the first projection 611 and the slot 60d is smaller than a distance between the slot 60d and the second projection 621.

As shown in FIG. 11, when a force in the fastening direction T is applied to the first projection 611 of the rotation auxiliary member 60 by hand, the rotation auxiliary member 60 rotates in the fastening direction T about the axis AX, and the engaging surface 65a of the rotation auxiliary member 60 comes into contact with the engaged surface 42b of the head 40. Thus, the rotation auxiliary member 60 engages with the head 40. As a result, the head 40 rotates in the fastening direction T together with the rotation auxiliary member 60. Thus, a width of the slot 60d in a circumferential direction tends to be reduced due to a counteraction to the force in the fastening direction T. In this case, since the distance between the first projection 611 and the slot 60d is small, the fastening portion 6b is deformed such that the width of the slot 60d is increased. As a result, the gap between the engaged surface 42b of the head 40 and the engaging surface 65a of the rotation auxiliary member 60 is reduced, so that the engaging force between the head 40 and the rotation auxiliary member 60 is increased.

After the connection of the pipe 110 by the fitting 100, the operator moves the rotation auxiliary member 60 rearward R to detach the rotation auxiliary member 60 from the head 40. Then, the operator moves the rotation auxiliary member 60 to allow the pipe 110 to pass through the slot 60d. Thus, the rotation auxiliary member 60 is detached from the head 40 and the pipe 110.

In a case of detaching the pipe 110 connected by the fitting 100, the operator moves the rotation auxiliary member 60 to allow the pipe 110 to pass through the slot 60d, thereby to fit the rotation auxiliary member 60 to the pipe 110. Then, the operator moves the rotation auxiliary member 60 forward F to fit the rotation auxiliary member 60 to the head 40. Thus, the rotation auxiliary member 60 is attached to the head 40 and the pipe 110.

In this state, when the operator applies a force in the releasing direction U to the second projection 621 of the rotation auxiliary member 60 by hand, the rotation auxiliary member 60 rotates about the axis AX in the releasing direction U, and the engaging surface 65a of the rotation auxiliary member 60 comes into contact with the engaged surface 42b of the head 40. Thus, the rotation auxiliary member 60 engages with the head 40. As a result, the head 40 rotates in the releasing direction U together with the rotation auxiliary member 60.

(7-2) While the plurality of projections 610 to 640 are provided on the fastening portion 6b of the rotation auxiliary member 6 in the embodiment of FIGS. 1 to 9, the number of the plurality of projections 610 to 640 is not limited to this. Only a single projection 610 may be provided on the fastening portion 6b of the rotation auxiliary member 6. In this case, the position of the projection 610 on the rotation auxiliary member 6 is similar to that of the first projection 610 in the embodiment of FIGS. 1 to 9.

While the plurality of projections 611 to 641 are provided on the fastening portion 6b of the rotation auxiliary member 60 in the embodiment of FIGS. 11 to 12, the present invention is not limited to this. Only a single projection 611 may be provided on the fastening portion 6b of the rotation auxiliary member 60. In this case, the position of the projection 611 on the rotation auxiliary member 60 is similar to that of the first projection 611 in the embodiment of FIGS. 11 and 12.

(8) Correspondences between Constituent Elements in Claims and Parts in Preferred Embodiments In the following paragraphs, non-limiting examples of correspondences between various elements recited in the claims below and those described above with respect to various preferred embodiments of the present disclosure are explained.

In the above-mentioned embodiment, the front end surface 60*a* is an example of a first end, the rear end surface 60*b* is an example of a second end, and the projection 610, 611 is an example of a first projection. The projection 620, 621 is an example of a second projection, the engaging surface 41 or the engaged surface 42*b* is an example of a first engaging surface, and the engaged surface 62*a* or the engaging surface 65*a* is an example of a second engaging surface. The fastening direction T is an example of a first rotation direction, and the releasing direction U is an example of a second rotation direction.

(9) Aspects

The above-mentioned plurality of exemplary embodiments are understood as specific examples of the below-mentioned aspects by those skilled in the art.

(Item 1) A fitting used for connection of a pipe of a chromatograph according to one aspect includes a screw portion that is rotatable around an axis extending in one direction, the screw portion, and a rotation auxiliary member that has a first end and a second end on opposite sides in one direction and is configured to be engageable with the operating portion, the operating portion is provided to be rotatable in a first rotation direction of fastening the screw portion and in a second rotation direction of releasing the screw portion, a slot extending from the first end to the second end is provided in the rotation auxiliary member, and also a first projection that protrudes outward is provided on the rotation auxiliary member, and a positional relationship between the first projection and the slot is set such that an engaging force between the rotation auxiliary member and the operating portion is increased due to a change in width of the slot in a case where a force is applied to the first projection in the first rotation direction with the rotation auxiliary member engaging with the operating portion.

With the fitting according to item 1, when a force is applied to the first projection in the first rotation direction with the rotation auxiliary member engaging with the operating portion, a torque in the first rotation direction is applied from the operating portion to the screw portion. Thus, the screw portion is fastened. With the aforementioned configuration, in a case where the force is applied to the first projection in the first rotation direction, the engaging force between the rotation auxiliary member and the operating portion is increased due to a change in width of the slot of the rotation auxiliary member. Therefore, the force is securely transmitted from the rotation auxiliary member to the operating portion without idle running of the rotation auxiliary member. In this case, since the first projection protrudes outward, the operating portion can be rotated with a small force.

Also, the rotation auxiliary member can be detached from the pipe and the operating portion through the slot after the pipe is connected by fastening of the screw portion. Thus, a connecting structure of the pipe is not increased in size. As a result, it is possible to securely connect the pipe while suppressing an increase in size of the connecting structure.

(Item 2) In the fitting according to item 1,
the operating portion may have a first engaging surface,
the rotation auxiliary member may have a second engaging surface that engages with the first engaging surface to prevent relative rotation with respect to the operating portion in the first and second rotation directions, and a positional relationship between the first projection and the slot may be set such that an engaging force between the first engaging surface and the second engaging surface is increased due to a change in width of the slot in a case where a force is applied to the first projection in the first rotation direction with the first and second engaging surfaces engaging with each other.

With the fitting according to item 2, in a case where the force is applied to the first projection in the first rotation direction, the engaging force between the first engaging surface and the second engaging surface is increased, so that the force is securely transmitted from the rotation auxiliary member to the operating portion.

(Item 3) In the fitting according to item 2,
the operating portion may have an outer peripheral surface that includes the first engaging surface,
the rotation auxiliary member may have an inner peripheral surface that includes the second engaging surface and an outer peripheral surface that has the first projection, and
the first projection may be arranged within an angular range of 90 degrees in the second rotation direction from the slot such that the engaging force between the first engaging surface and the second engaging surface is increased due to a reduction in width of the slot in the case where the force is applied to the first projection in the first rotation direction with the first and second engaging surfaces engaging with each other.

With the fitting according to item 3, the second engaging surface of the inner peripheral surface of the rotation auxiliary member comes into contact with the first engaging surface of the outer peripheral surface of the operating portion. In this case, the width of the slot is reduced in the case where the force is applied to the first projection in the first rotation direction. Thus, the engaging force between the first engaging surface and the second engaging surface is increased.

(Item 4) In the fitting according to item 2,
the operating portion may have an inner peripheral surface that includes the first engaging surface,
the rotation auxiliary member may have an outer peripheral surface that includes the second engaging surface and has the first projection,
the first projection may be arranged within an angular range of 90 degrees in the first rotation direction from the slot such that the engaging force between the first engaging surface and the second engaging surface is increased due to an increase in width of the slot in the case where the force is applied to the first projection in the first rotation direction with the first and second engaging surfaces engaging with each other.

With the fitting according to item 4, the second engaging surface of the outer peripheral surface of the rotation auxiliary member comes into contact with the first engaging surface of the inner peripheral surface of the operating portion. In this case, the width of the slot is increased in the case where the force is applied to the first projection in the first rotation direction. Thus, the engaging force between the first engaging surface and the second engaging surface is increased.

(Item 5) In the fitting according to any one of items 1 to 4,
a second projection may further be provided on the rotation auxiliary member, and a distance between the first projection and the slot may be smaller than a distance between the slot and the second projection.

With the fitting according to item 5, the rotation auxiliary member is easily rotated by applying the force to the first projection and the second projection.

(Item 6) In the fitting according to item 3,
the rotation auxiliary member may have a front end surface and a rear end surface on the first end and the second end, respectively, and may have an opening in the front end,
the opening may have the inner peripheral surface that includes the second engaging surface,
a second projection may further be provided on the rotation auxiliary member,
a distance between the first projection and the slot may be smaller than a distance between the slot and the second projection, and
the second projection may be provided on an opposite side of the slot to the first projection.

With the fitting according to item 6, the width of the slot is increased in a case where the force is applied to the second projection in the first rotation direction. With the aforementioned configuration, in a case where the force is applied to the first projection and the second projection in the first rotation direction, the distance between the slot and the second projection is larger than that between the first projection and the slot and, therefore, the action of increasing the width of the slot becomes relatively small. This suppresses a reduction in engaging force between the first engaging surface and the second engaging surface. Thus, the rotation auxiliary member is easily rotated by applying the force to the first and second projections.

Also, the width of the slot can be increased by applying the force to the second projection in the first rotation direction and not applying the force to the first projection in the first rotation direction. Thus, the second engaging surface of the rotation auxiliary member can be easily released from the first engaging surface of the operating portion. As a result, the rotation auxiliary member can be easily detached from the operating portion.

(Item 7) In the fitting according to item 4,
the rotation auxiliary member may have
a front end surface and a rear end surface on the first end and the second end, respectively, and
a protrusion that protrudes forward from the front end surface,
the protrusion may have the outer peripheral surface that includes the second engaging surface,
a second projection may further be provided on the rotation auxiliary member,
a distance between the first projection and the slot may be smaller than a distance between the slot and the second projection, and
the second projection may be provided on an opposite side of the slot to the first projection.

With the fitting according to item 7, the width of the slot is reduced in a case where the force is applied to the second projection in the first rotation direction. With the aforementioned configuration, in the case where the force is applied to the first projection and the second projection in the first rotation direction, the distance between the slot and the second projection is larger than that between the first projection and the slot and, therefore, the action of reducing the width of the slot becomes relatively small. This suppresses a reduction in engaging force between the first engaging surface and the second engaging surface. Thus, the rotation auxiliary member is easily rotated by applying the force to the first and second projections.

Also, the width of the slot can be reduced by applying the force to the second projection in the first rotation direction and not applying the force to the first projection in the first rotation direction. Thus, the second engaging surface of the rotation auxiliary member can be easily released from the first engaging surface of the operating portion. As a result, the rotation auxiliary member can be easily detached from the operating portion.

(Item 8) In the fitting according to any one of items 2 to 7,
the first engaging surface may have a non-circular shape in a cross section intersecting with the one direction, and
the second engaging surface may have a non-circular shape that is engageable with the first engaging surface in a cross section intersecting with the one direction.

With the fitting according to item 8, the first engaging surface that has the non-circular shape in the cross section intersecting with the one direction and the second engaging surface that has the non-circular shape in the cross section intersecting with the one direction are engaged with each other, so that the first engaging surface of the operating portion and the second engaging surface of the rotation auxiliary member are engaged with each other due to the shapes of the first and second engaging surfaces in addition to a friction force. Thus, the relative rotation of the rotation auxiliary member and the operating portion is suppressed.

(Item 9) A pipe connecting structure according to another aspect may include
a pipe of a chromatograph,
the fitting according to any of items 1 to 8, and
a pipe connector to which the pipe is connected by the fitting.

With the pipe connecting structure according to item 9, it is possible to securely connect the pipe while suppressing an increase in size of the connecting structure.

(Item 10) A liquid chromatograph according to another aspect may include
a plurality of constituent elements, and
a pipe may be connected to any of the plurality of constituent elements by the pipe connector according to item 9.

With the liquid chromatograph according to item 10, it is possible to securely connect the pipe while suppressing an increase in size of the connecting structure.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A fitting for connection of a pipe of a chromatograph, comprising:
   a screw portion that is rotatable around an axis extending in one direction;
   an operating portion that applies a torque around the axis to the screw portion; and
   a rotation auxiliary member that has a first end and a second end on opposite sides in the one direction and is configured to be engageable with the operating portion,
   wherein the operating portion is provided to be rotatable in a first rotation direction of fastening the screw portion and in a second rotation direction of releasing the screw portion, a knurl and a slot extending from the first end to the second end are provided in the rotation auxiliary member, also a first projection that protrudes outward with a height higher than a height of the knurl and causes the rotation auxiliary member to be deformed such that a width of the slot is reduced in a case where a force is applied in a fastening direction and a second projection that protrudes outward with a height higher than the height of the knurl and causes the rotation auxiliary member to be deformed such that the width of the slot is increased in the case where the force is applied in the fastening direction are provided on the rotation auxiliary member, and a distance between the second projection and the slot is larger than a distance between the first projection and the slot, and a positional relationship between the first projection and the slot is set such that an engaging force between the rotation auxiliary member and the operating portion is increased due to a change in width of the slot in a case where the force is applied to the first projection in the fastening direction with the rotation auxiliary member engaging with the operating portion.

2. The fitting according to claim 1, wherein the operating portion has a first engaging surface, the rotation auxiliary member has a second engaging surface that engages with the first engaging surface to prevent relative rotation with respect to the operating portion in the first and second rotation directions, and a positional relationship between the first projection and the slot is set such that an engaging force between the first engaging surface and the second engaging surface is increased due to a change in width of the slot in a case where a force is applied to the first projection in the first rotation direction with the first and second engaging surfaces engaging with each other.

3. The fitting according to claim 2, wherein the operating portion has an outer peripheral surface that includes the first engaging surface, the rotation auxiliary member has an inner peripheral surface that includes the second engaging surface and an outer peripheral surface that has the first projection, and the first projection is arranged within an angular range of 90 degrees in the second rotation direction from the slot such that the engaging force between the first engaging surface and the second engaging surface is increased due to a reduction in width of the slot in the case where the force is applied to the first projection in the first rotation direction with the first and second engaging surfaces engaging with each other.

4. The fitting according to claim 3, wherein the rotation auxiliary member has a front end surface and a rear end surface on the first end and the second end, respectively, and has an opening in the front end, the opening has the inner peripheral surface that includes the second engaging surface, and the second projection is provided on an opposite side of the slot to the first projection.

5. The fitting according to claim 2, wherein the operating portion has an inner peripheral surface that includes the first engaging surface, the rotation auxiliary member has an outer peripheral surface that includes the second engaging surface and has the first projection, the first projection is arranged within an angular range of 90 degrees in the first rotation direction from the slot such that the engaging force between the first engaging surface and the second engaging surface is increased due to an increase in width of the slot in the case where the force is applied to the first projection in the first rotation direction with the first and second engaging surfaces engaging with each other.

6. The fitting according to claim 5, wherein the rotation auxiliary member has a front end surface and a rear end surface on the first end and the second end, respectively, and a protrusion that protrudes forward from the front end surface, wherein the protrusion has the outer peripheral surface that includes the second engaging surface, and the second projection is provided on an opposite side of the slot to the first projection.

7. The fitting according to claim 2, wherein the first engaging surface has a non-circular shape in a cross section intersecting with the one direction, and the second engaging surface has a non-circular shape that is engageable with the first engaging surface in a cross section intersecting with the one direction.

8. A pipe connecting structure comprising:
a pipe of a chromatograph;
the fitting according to claim 1; and
a pipe connector to which the pipe is connected by the fitting.

9. A liquid chromatograph comprising a plurality of constituent elements, wherein a pipe is connected to any of the plurality of constituent elements by the pipe connector according to claim 8.

* * * * *